United States Patent
Doole et al.

(10) Patent No.: US 7,370,049 B2
(45) Date of Patent: May 6, 2008

(54) DETECTION AND PREVENTION OF WRITING CONFLICTS WITHIN NESTED QUERY STATEMENTS

(75) Inventors: Douglas J. Doole, Don Mills (CA); Paul M. Bird, Markham (CA)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 10/413,637

(22) Filed: Apr. 14, 2003

(65) Prior Publication Data

US 2003/0200214 A1 Oct. 23, 2003

(30) Foreign Application Priority Data

Apr. 19, 2002 (CA) .................................... 2382712

(51) Int. Cl.
*G06F 17/30* (2006.01)
(52) U.S. Cl. .................................... 707/8; 707/3; 707/2
(58) Field of Classification Search ................ 707/1–4, 707/8–10, 100, 101
See application file for complete search history.

(56) References Cited

U.S. PATENT DOCUMENTS

| | | | | |
|---|---|---|---|---|
| 5,857,182 | A | * | 1/1999 | DeMichiel et al. ............. 707/3 |
| 5,873,075 | A | * | 2/1999 | Cochrane et al. ............. 707/2 |
| 6,003,026 | A | | 12/1999 | Bonzi |
| 6,055,539 | A | | 4/2000 | Singh et al. |
| 6,067,542 | A | | 5/2000 | Carino, Jr. |
| 6,081,801 | A | | 6/2000 | Cochrane et al. |
| 6,092,062 | A | | 7/2000 | Lohman et al. |
| 6,112,198 | A | | 8/2000 | Lohman et al. |
| 6,219,660 | B1 | | 4/2001 | Haderle et al. |
| 6,304,873 | B1 | | 10/2001 | Klein et al. |
| 6,304,876 | B1 | | 10/2001 | Isip, Jr. |
| 6,321,235 | B1 | | 11/2001 | Bird |
| 2001/0016844 | A1 | | 8/2001 | Isip, Jr. |
| 2002/0023069 | A1 | | 2/2002 | Blank et al. |

OTHER PUBLICATIONS

Baru, C. K., Fecteau, G. and Malkemus, T. R. "On-Line Data Redistribution in a Shared-Nothing Parallel Database System," *IBM Technical Disclosure Bulletin*, vol. 40, No. 1, Jan. 1997.
Bonneau, S. and Hameurlain, A. "Hybrid Simultaneous Scheduling and Mapping in SQL Multi-Query Parallelization," Database and Expert Systems Applications, 10 Intl. Conf., DEXA '99, *Lecture Notes in Computer Science*, vol. 1677, pp. 88-99., Abstract only.

(Continued)

*Primary Examiner*—Don Wong
*Assistant Examiner*—Sheree N Brown
(74) *Attorney, Agent, or Firm*—Sawyer Law Group LLP (57) ABSTRACT

Conflict checking for writing operations in an SQL database system is carried out for nested statements invoked by a parent statement. Each statement has an associated table access data structure defined at compile-time indicating the tables in the database that the statement accesses and the mode of access. At execution-time the table access data structure for each nested statement is accessed and the information is compared with a list of tables maintained for the parent statement to determine if there is a read/write or write/write conflict possible if the nested statement is executed. Where there is no conflict detected, the information from the table access data structure is copied to the list of tables.

28 Claims, 2 Drawing Sheets

OTHER PUBLICATIONS

Lee, Seung-Hoon, Jang, Gi-Hwa, Lee, Su-Hyun, Jung, Sung-Hwan. A Content-Based Image Retrieval System Using Extended SQL in RDBMS, *Proceedings of ICICS*, Intl. Conf. on Information, Communications and Signal Processing, vol. 2, pp. 1069-1072, Abstract only.

Hameurlain, A. and Morvan, F. Scheduling and Mapping for Parallel Execution of Extended SQL Queries, *Proceedings of the 1995 ACM CIKM Int. Conf. on Information and Knowledge Management*, pp. 197-204, Abstract only.

\* cited by examiner

DETECTION AND PREVENTION OF WRITING CONFLICTS WITHIN NESTED QUERY STATEMENTS

FIELD OF THE INVENTION

The present invention is directed to an improvement computing systems and in particular to an improvement in error detection and prevention in the execution of query statements in a database system.

BACKGROUND OF THE INVENTION

Relational Database Management Systems (RDBMSs) typically support the ability to have one or more query statements such as SQL (Structured Query Language) statements called from within the scope of execution of a parent query statement. With the support of such capabilities as the inclusion of SQL statements within User-Defined Functions (UDFs) and the calling of stored procedures (STPs) from within triggers, it is now possible for the execution of a parent query statement to result in the execution of one or more nested SQL statements.

A problem in database systems executing nested query statements is the detection and prevention of read/write and write/write conflicts (writing conflicts) that may occur between nested statements, and between nested statements and the parent statement itself. Such detection and prevention is necessary to ensure that the overall execution results of the parent and nested statements are consistent and deterministic.

A read/write conflict may occur when a SELECT statement and a DELETE statement are defined so that on execution they both act on the same table. An example of a write/write conflict is when on execution an INSERT statement and a DELETE statement act on the same table. When these conflicting actions occur within the processing of nested statements invoked by a single parent statement, it is advantageous to be able to detect and prevent these collisions. Without such detection, non-deterministic processing may result with potential resulting data sets with missing rows, incorrect results, or even infinite loops in processing.

In a database system that is implemented in a partitioned shared-nothing environment, the above problems are potentially compounded. In such a system, the nested query statements can be executing at any partition within the system and the conflicts between the nested statements can be different at each partition. In addition, the conflicting statements can be occurring at different nesting levels, relative to the original parent statement, when they collide at a partition.

One approach to avoiding such read/write and write/write (writing) conflicts is to first require routines that modify query data to be defined as such within the system. The definition of each routine includes information on what tables will be read and written by the routine. The query compiler can then set up the query access plan such that conflicts will not occur. A significant problem with this approach is that it may result in performance penalties for statements that do not, in fact, cause conflicts.

Another approach is to implement a runtime detection and prevention algorithm. During the time that a table is being modified, the database system ensures that the table cannot be accessed by a nested statement (in a trigger or UDF) or a runtime error will result. Because the nested statements are precluded from accessing the table during the time that it is modified, results of this approach are potentially affected by the access plan selected by the database system. Such an approach is also difficult to implement in a database system implemented in a partitioned, shared-nothing environment. In addition, the detection and prevention occurs only for the time during which a table is being accessed. However, protecting a table only while it is in use can make the behaviour of statements acting on that table non-deterministic. This form of conflict avoidance can be very inconvenient for the user as the user has no direct control over how the compiler chooses to process query statements and therefore the user cannot make the conflict checking predictable.

It is therefore desirable to provide detection and prevention of read/write and write/write conflicts in an query database system that permits access to data that will not cause a conflict and that is not subject to the access plans chosen by the database system.

SUMMARY OF THE INVENTION

According to an aspect of the present invention there is provided an improved method and system for the detection and prevention of read/write and write/write conflicts in a relational database system.

According to another aspect of the invention there is provided a method and system for defining a table access data structure for database control statements at compile time. At execution, conflict checking is carried out by comparing the information in the table access data structures for nested database control statements with information included in a list of tables maintained for each parent statement. Conflicts are determined based on the tables accessed, the mode of access, and the table access scope for the statements that are subject to the conflict check.

According to another aspect of the invention there is provided a computer program product for detection of writing conflicts for database control statements in a relational database system, the database control statements including a parent statement and a set of invoked nested statements, the program product including a computer usable medium tangibly embodying computer readable program code means including: code means for maintaining a set of statement table access information in association with each database control statement, code means for generating, at execution time, a set of cumulative table access information associated with the parent statement including information from the statement table access information for the parent statement, code means for, prior to execution of each statement in the set of nested statements, comparing the set of statement table access information for the nested statement with the set of cumulative table access information to determine whether a writing conflict will occur on execution of the nested statement, and code means for, if no writing conflict is determined for a specified nested statement, updating the set of cumulative table access information to include the set of statement table access information for the specified nested statement. According to another aspect of the invention there is provided the above computer program product in which the database control statements are SQL statements.

According to another aspect of the invention there is provided the above computer program product in which the relational database system is a compiled relational database system and in which the code means for maintaining a set of statement table access information further includes code means for generating the set of statement table access information at compile time.

According to another aspect of the invention there is provided the above computer program product in which the set of statement table access information for each database control statement includes the identity of tables to be accessed by the execution of the statement and the access mode of the table access.

According to another aspect of the invention there is provided the above computer program product in which each element of the set of cumulative table access information associated with the parent statement, includes information specifying a table, a table access scope and an access mode, each table access scope containing one or more database control statements, the set of cumulative table access information being initialized to include: the table and access mode information from the statement table access information for the parent statement, and information specifying the table access scope containing the parent statement.

According to another aspect of the invention there is provided a computer program product for detection of writing conflicts in a relational database system, the writing conflict detection being for database control statements including a parent statement and a set of invoked nested statements, the relative definition of the parent statement and each of the nested statements creating a set of table access scopes, each of the table access scopes containing one or more of the parent statement and the nested statements, the program product including a computer usable medium tangibly embodying computer readable program code means including: code means for maintaining a set of statement table access information in association with each database control statement, the table access information for each of the statements recording the identity of tables to be accessed by the execution of the statement and recording the access mode of the table access, code means for generating, at execution time, a set of cumulative table access information associated with the parent statement, each element in the set of cumulative table access information recording information specifying a table, a table access scope and an access mode, the set of cumulative table access information being initialized with the table and access mode information from the statement table access information for the parent statement, and information specifying the table access scope containing the parent statement code means for, prior to execution of each statement in the set of nested statements, comparing the table and the access mode information for a sequence of selected elements in the set of statement table access information for the nested statement with the table and access mode information for each element in the set of cumulative table access information, until either a writing conflict is determined for the nested statement by the comparison of a one of the selected elements or each element in the set of statement table access information for the nested statement has been compared with each element in the set of cumulative table access information for the parent statement, and code means for, if no writing conflict is determined for a specified nested statement, adding to the set of cumulative table access information: the information contained in each element in the set of statement table access information for the specified nested statement and information specifying the table access scope containing the specified nested statement.

According to another aspect of the invention there is provided the above computer program product in which the code means for comparing, for each nested statement, a selected element in the set of statement table access information with each element in the set of cumulative table access information to determine a writing conflict includes: code means for looking up the table information for the selected element in the set of cumulative table access information, and when there is a match with a located element in the set, in the case when the table access scope containing the nested statement matches the table access scope of the located element, determining there to be no conflict for the selected element, in the case when the table access scope containing the nested statement does not match the table access scope of the located element, and in the case when the access mode of the selected element and the access mode of the located element both correspond to the "read" value, determining there to be no conflict for the selected element and otherwise determining there to be a conflict for the selected element.

According to another aspect of the invention there is provided the above computer program product in which the identity of tables to be accessed by the execution of the statement is defined with reference to the each permanent table and each declared global temporary table accessed by the statement on its execution.

According to another aspect of the invention there is provided the above computer program product further including code means for deleting the set of cumulative table access information for the parent statement on the completion of execution of the parent statement.

According to another aspect of the invention there is provided a computer-implemented method for detection of writing conflicts in a relational database system for database control statements including a parent statement and a set of invoked nested statements, the method including: maintaining a set of statement table access information in association with each database control statement, generating, at execution time, a set of cumulative table access information associated with the parent statement including information from the statement table access information for the parent statement, comparing, prior to execution of each statement in the set of nested statements, the set of statement table access information for the nested statement with the set of cumulative table access information to determine whether a writing conflict will occur on execution of the nested statement, and updating, in the case when no writing conflict is determined for a specified nested statement, the set of cumulative table access information to include the set of statement table access information for the specified nested statement According to another aspect of the invention there is provided a computer-implemented method for detection of writing conflicts in a relational database system, the writing conflict detection being for database control statements including a parent statement and a set of invoked nested statements, the relative definition of the parent statement and each of the nested statements creating a set of table access scopes, each of the table access scopes containing one or more of the parent statement and the nested statements, the method including: maintaining a set of statement table access information in association with each database control statement, the table access information for each of the statements recording the identity of tables to be accessed by the execution of the statement and recording the access mode of the table access, generating, at execution time, a set of cumulative table access information associated with the parent statement, each element in the set of cumulative table access information recording information specifying a table, a table access scope and an access mode, the set of cumulative table access information being initialized with the table and access mode information from the statement table access information for the parent statement, and information specifying the table access scope containing the parent statement comparing, prior to execution of each statement in the set of nested statements, the table and the access mode information for selected elements in the set of statement table access information for the nested statement with the table and access mode information for each element in the set of cumulative table access information, until either a writing conflict is determined for the nested statement or each element in the set of statement table access information for the nested statement has been compared with each element in the set of cumulative table access information for the parent statement, and updating, if no writing conflict is determined for a specified nested statement, the set of cumulative table access information with information including: the information contained in each element in the set of statement table access information for the specified nested statement and information specifying the table access scope containing the specified nested statement.

According to another aspect of the invention there is provided the above method in which the step of comparing, for each nested statement, a selected element in the set of statement table access information with each element in the set of cumulative table access information to determine a writing conflict includes looking up the table information for the selected element in the set of cumulative table access information, and when there is a match with a located element in the set, in the case when the table access scope containing the nested statement matches the table access scope of the located element, determining there to be no conflict for the selected element, in the case when the table access scope containing the nested statement does not match the table access scope of the located element, and in the case when the access mode of the selected element and the access mode of the located element both correspond to the "read" value, determining there to be no conflict for the selected element and otherwise determining there to be a conflict for the selected element.

According to another aspect of the invention there is provided the above method further including deleting the set of cumulative table access information for the parent statement on the completion of execution of the parent statement.

According to another aspect of the invention there is provided a computer-implemented method for carrying out writing conflict detection in a compiled SQL database system, for a parent SQL statement having a set of invoked nested SQL statements, the parent and nested SQL statements each being defined to be within one of a set of table access scopes, the method including: generating, at compile time, for each statement, a table access data structure associated with the statement, the table access data structure including an entry for tables accessed by the statement, each entry including a table identifier and an access mode identifier, generating, at execution time, a list of tables associated with the parent statement, each entry in the list of tables including a table identifier, a table access scope identifier and an access mode identifier, the list of tables being initialized with the information from the table access data structure entries of the parent statement, before executing each statement in the set of nested statements, comparing the tables and access modes identified by the entries in the table access data structure for the nested statement with the entries in the list of tables, until a conflict is declared or until each entry in the table access data structure has been compared with the entries in the list of tables, and if no conflict is declared, adding to the list of tables the information contained in each entry in the table access data structure for the nested statement and the table access scope defined to contain the nested statement.

According to another aspect of the invention there is provided the above method in which the step of comparing, for each nested statement, a table access data structure entry to the entries in the list of tables to determine a conflict includes looking up the table access data structure entry table identifier in the table identifiers in the entries in the list of tables, and when there is a match with a located list of tables entry, in the case when the table access scope of the nested statement matches the table access scope identifier of the located list of tables entry declaring there to be no conflict for the table access data structure entry, in the case when the table access scope of the nested statement does not match the table access scope identifier of the located list of tables entry, and in the case when table access scope entry access mode identifier and the located list of tables entry access mode identifier both correspond to the read value, declaring there to be no conflict for the table access data structure entry and otherwise declaring there to be a conflict for the table access data structure entry.

According to another aspect of the invention there is provided the above method in which the table access data structure for each statement includes an entry corresponding to, and including the table identifier for, each permanent table and each declared global temporary table accessed by the statement, and the mode of access identifier for each entry reflecting the mode in which the table corresponding to the entry is accessed by the execution of the statement.

According to another aspect of the invention there is provided the above method further including: defining the set of table access scopes by generating a data structure representing a table access scope with an associated unique counter value for each application start of an SQL statement, each UDF or method invoked and each stored procedure invoked directly from a trigger.

According to another aspect of the invention there is provided the above method further including: deleting the list of tables on the completion of execution of the parent statement.

According to another aspect of the invention there is provided the above method in which the database system supports data partitions and inter-partition concurrency in a shared-nothing architecture, the list of tables being defined relative to the partition in which the method is carried out, the method further including: sending an event to the partition to indicate that the completion of execution of the parent statement has occurred and in which the step of deleting the list of tables is carried out after receipt of the event at the partition.

According to another aspect of the invention there is provided the above method further including: setting a detect conflict flag in association with the parent statement in the case when the parent statement contains an invocation of a UDF or method or when the parent statement invokes a stored procedure directly from a trigger and in which either the parent statement modifies SQL data or a routine invoked by the parent statement modifies SQL data.

According to another aspect of the invention there is provided the above method further including: declaring that there is no conflict in the case when the detect conflict flag is not set for the parent statement.

According to another aspect of the invention there is provided the above method further including: preventing execution of each nested statement for which a conflict is declared.

According to another aspect of the invention there is provided the a computer program product including a computer usable medium tangibly embodying computer readable program code means for implementation in an SQL database system, the computer readable program code means including code means for carrying out the steps of the above methods.

Advantages of the present invention include the provision of consistent, repeatable read/write and write/write conflict detection based on the tables accessed by a statement, not on the methods used to access these tables. A further advantage is a uniform, efficient processing approach to writing conflict detection in both non-partitioned and multiple partition, shared-nothing database environments. Further, nested SQL statements for the same parent SQL statement are treated equally at each partition and conflicts between such statements are detected at a local, partition level rather than at a global application level.

According to another aspect of the present invention there is provided a method for detecting writing conflicts in a database system for a database control statement, said database control statement comprising a parent statement and a nested statement, said method comprising if, prior to execution of said nested statement, table access information for said nested statement and cumulative table access information for said parent statement indicates that a writing conflict does not exist, executing said nested statement.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION

Figure 1:
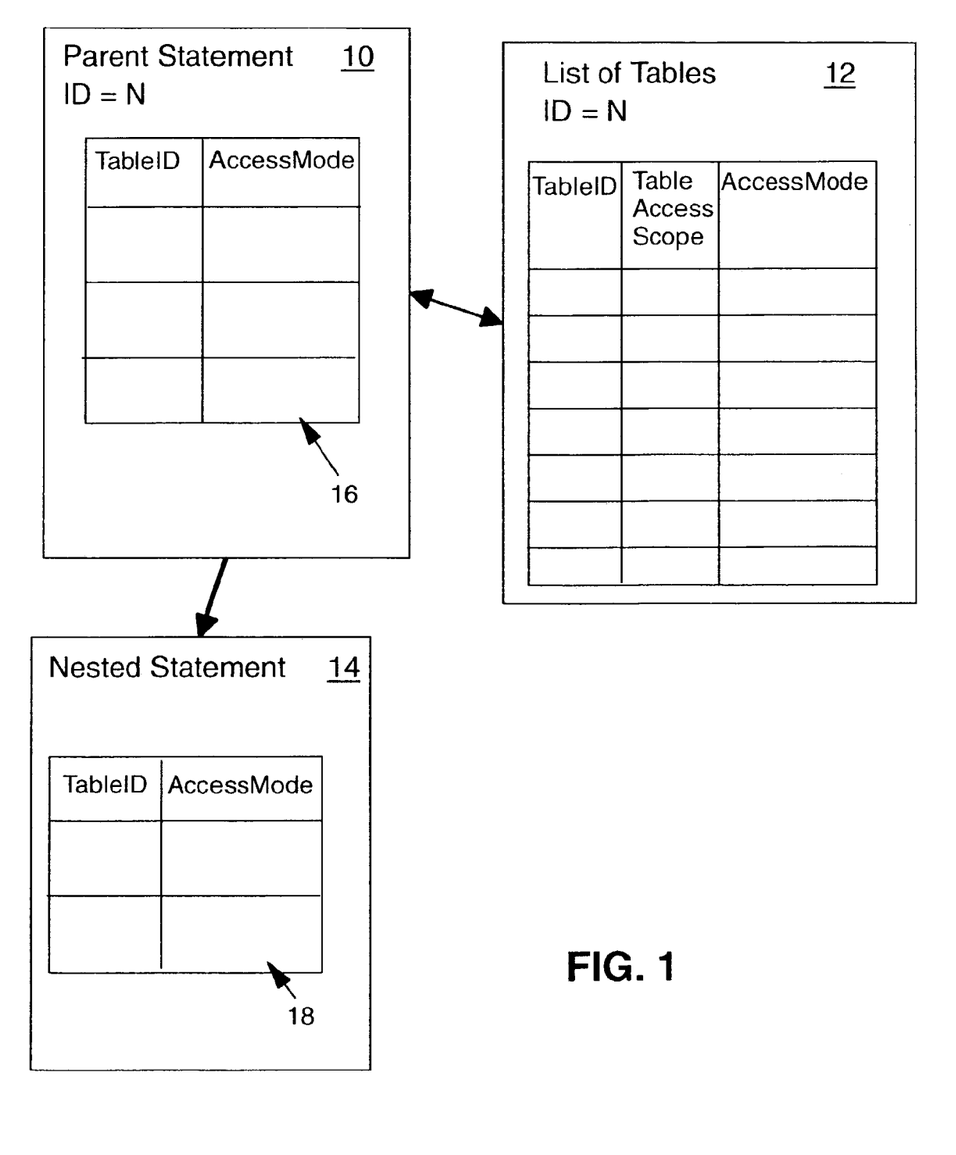
FIG. 1 is a block diagram illustrating table access information maintained in accordance with the preferred embodiment.

FIG. 1 is a block diagram illustrating table access information maintained in an example defined in accordance with the preferred embodiment. The preferred embodiment is described with reference to a database system for SQL. However, as persons of ordinary skill in the art will appreciate query languages such as XQL, (XML Query Language), Xquery, XML-QL, SQL, etc can be employed. However, the embodiments described herein use SQL. Additionally, other database types (e.g. flatfile databases etc.) could also be employed. In FIG. 1, parent statement 10 represents the executable representation of an SQL statement. The preferred embodiment is implemented for a database system having a component for compiling SQL statements into an executable form (an SQL compiler). The executable representations of the SQL statements are run by the database system during an execution phase.

According to the preferred embodiment, a list of tables data structure is associated with certain SQL statements at runtime. FIG. 1 shows list of tables 12 associated with parent statement 10. As is shown in the figure, parent statement 10 has an identifier that uniquely identifies parent statement 10 in the database system (shown as ID=N). List of tables 12 is identifiable as being associated with parent statement 10 by retaining a copy of the parent statement's identifier (The example of FIG. 1 also shows nested statement 14. Nested statement 14 is a compiled representation of an SQL routine that is invoked by parent statement 10 during runtime.

At compile time (when the executable objects parent statement 10, nested statement 14 are defined) an additional set of information is recorded for each SQL statement by the SQL compiler. Information about all the permanent and declared global temporary tables accessed by the statement is collected by the SQL compiler and retained in association with the SQL statement being compiled. It will be apparent that no information is gathered for system temporary tables since such tables are not available for use outside the locally defined executable environment for the statement. The SQL compiler records information indicating whether a table is read, modified, or both. FIG. 1 shows this information as permanently associated with the SQL statement as part of the executable representation itself. For parent statement 10, table access data structure 16 is shown. For nested statement, FIG. 1 shows table access data structure 18. Both data structures 16, 18 are shown with records having table identifier (TableID) and table access mode (AccessMode) fields. As is described in further detail below, it is this information that is used to scan the current contents of list of tables 12 to see if executing a statement will result in a conflict.

A general outline of how writing conflicts are detected and prevented by the system of the preferred embodiment, with reference to the example of FIG. 1, is set out as follows:

a) For parent statement 10, a list of tables 12 is maintained. List of tables 10 contains entries that will reflect tables accessed by parent statement 10 and statements nested within the parent statement (nested statement 14, in the example of FIG. 1). Each entry also indicates a table access scope for the table (defined below) and the access mode for the table (whether the table is being read from or written to).

b) Before executing nested SQL statement 14, the tables accessed by that statement (as indicated by table access data structure 18) are compared against list of tables 12 (the list of tables for parent statement 10) to determine if there is a conflict.

i) If there is a conflict, an error state is defined and the database system prevents nested statement 14 from executing.

ii) If there is no conflict, the tables found in table access data structure 18 are added to list of tables 12 and nested statement 14 is indicated as ready for execution.

iii) When parent statement 10 has finished executing, list of table 12 (and, if they exist, similar lists of tables for any nested statements) is discarded (deleted).

In the preferred embodiment, conflicts are dependent on table access scope. A table access scope is a logical entity that is given an implementation representation in the system of the preferred embodiment. Statements are executed within a particular table access scope logical entity. A new table access scope is defined when any one of the following events takes place:

a) An application starts an SQL statement;
b) A UDF or method is invoked; or
c) A stored procedure is invoked directly from a trigger On return from a UDF, method or stored procedure, or on application SQL statement end, the table access scope of the return point statement will be entered.

Within a single table access scope, a table may be both read and written and, by definition, a conflict cannot occur. However, if a table is accessed from two table access scopes, then a conflict may occur. In the preferred embodiment, the table access scope logical entity is represented as follows:

for each parent statement that is executing, there will be a unique counter which starts at zero for each parent statement and is incremented for each new table access scope beneath the parent (root) statement; this new value is recognized as the table access scope ID for that table access scope and is used by all statements executing within that table access scope as their table access scope identifier.

The following gives a summary of conflicting and non-conflicting operations as recognized by the preferred embodiment. Non-conflicting operations are defined as follows:

a) Attempting to read or modify a table that is not being read or modified;

b) Attempting to read or modify a table that is being read or modified, but by a statement within the same table access scope; and c) Attempting to read a table that is only being read by one or more different table access scopes.

Conflicting operations are defined as follows:

a) Attempting to read or modify a table that is being modified by a different table access scope; and b) Attempting to modify a table that is being read by one or more different table access scopes.

The preferred embodiment permits these conditions to be identified and handled appropriately. The preferred embodiment carries out the processing for detection up front and therefore detects potential conflicts. The conflicts are indicated to be potential conflicts because conditional processing and timing differences can result in a conflict being avoided where the system of the preferred embodiment declares a conflict. This approach is followed to make conflict detection independent from the access plan chosen for the SQL statement by the database system.

Figure 2:
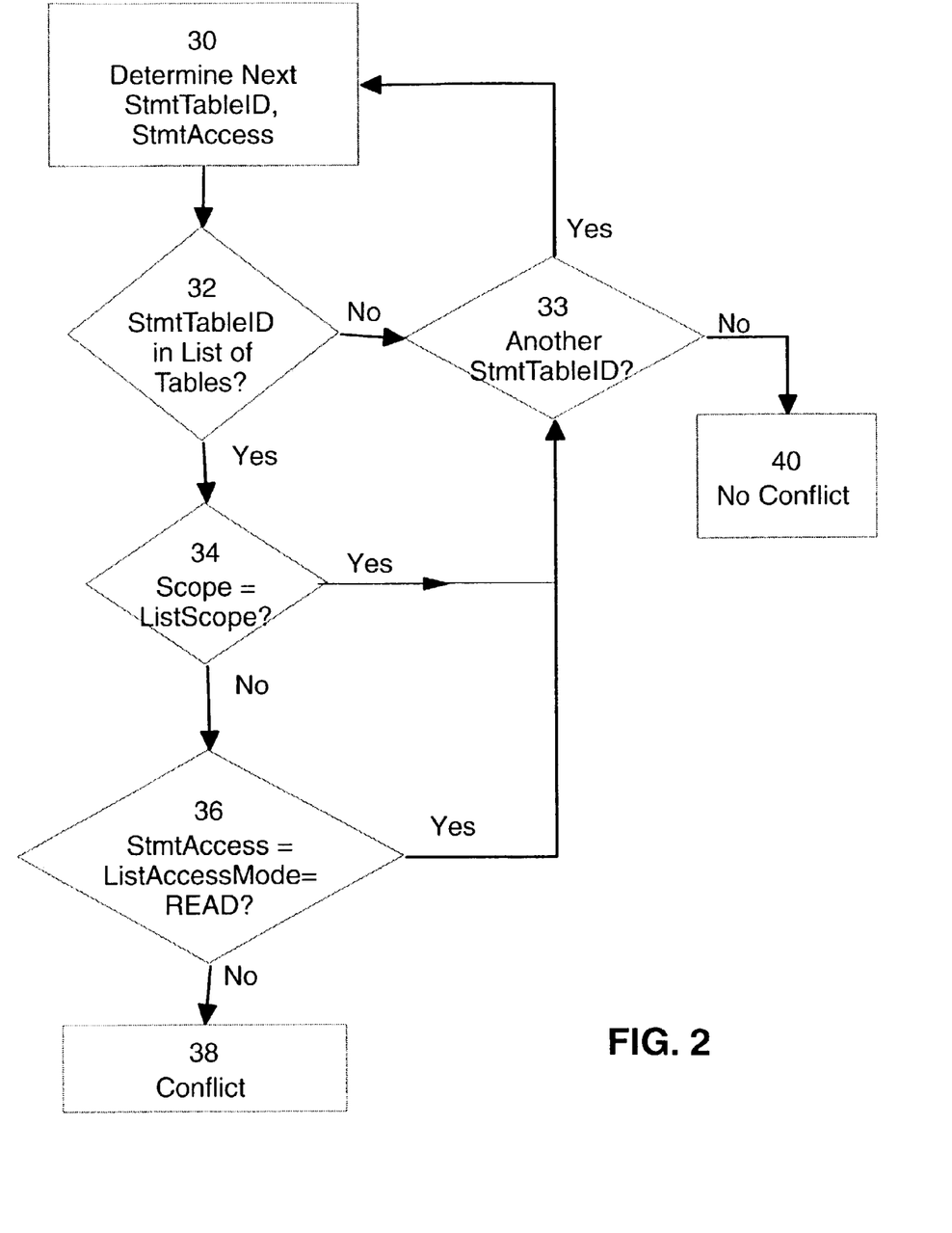
FIG. 2 is a flowchart illustrating conflict detection steps in accordance with the preferred embodiment.

The conflict identification process for a statement in accordance with the preferred embodiment is described with reference to FIG. 2. FIG. 2 is a flowchart showing the steps in determining if a conflict exists or not for a given statement:

a) The table access data structure for the statement is accessed to determine the next statement table identifier ("StmtTableID") and the statement access mode ("StmtAccess"), as is shown in box 30 of FIG. 2;

b) A lookup is done for StmtTableID in the TableID column of the appropriate list of tables (decision box 32);

c) If no match is found and if there are more table identifiers in the table access data structure, then loop to the first step (decision boxes 32, 33);

d) If no match is found and there are no more table identifiers in the table access data structure then return no conflict (decision box 33, box 40);

e) If a match is found (decision box 32) then:

i) If the current table access scope ID ("Scope" in FIG. 2) is the same as the table access scope of the matching entry ("ListScope" in decision box 34 of FIG. 2) then determine if there are more table identifiers in the table access data structure, if there are none, there is no conflict, if there are, then loop to the first step (decision box 33, box 40).

ii. If the table access scope IDs are different (decision box 34), but if the requested operation ("StmtAccess") and the matching entry's operation ("ListAccessMode") are both READ (decision box 36), then determine if there are more table identifiers in the table access data structure, if there are none, there is no conflict, if there are, then loop to the first step (decision box 33, box 40); otherwise, return conflict (box 38).

As may be seen from the above, if a conflict is found for any table in the table access data structure for the statement, then the statement is failed with an error (this prevents execution of the statement). If all the tables in the table access data structure have no conflict, then the statement is allowed to continue and processing moves on to recording the table operations, as set out below.

In the preferred embodiment, a number of steps are taken to update the list of tables with the tables in the table access data structure. For each entry in the table access data structure associated with the statement:

1. If Table ID is not in the list of tables, the list of tables is given a new entry containing TableID for the entry in the table access data structure, the table access scope for the statement and the access mode for the table from the table access data structure.

2. If Table ID is in the list of tables, with matching table access scope, the entry in the list is updated to include both the existing operation as well as the new operation.

3. If Table ID is in the list of tables with a different table access scope, the entry in the list of tables is updated to have a valuing showing multiple scopes as the table access scope. In this case, the operation must be a READ operation.

Although the above description indicates how conflict detection is carried out by the preferred embodiment, for many SQL statements the preferred embodiment is able to determine that the conflict checking steps are not necessary without requiring comparisons between the table access data structures and the list of tables. For example, if the statement invokes no routines containing SQL, then there is no possibility of a conflict, so performing conflict detection as described above introduces a performance penalty with no benefits. Similarly, if the statement is read-only, conflict detection is unnecessary. For the list of tables to be generated by the preferred embodiment, both of the following conditions must be satisfied:

a) There must be more than one table access scope for the statement (in other words, an invocation of a UDF, method, or stored procedure in a trigger must exist in the statement); and b) Either the statement must be a modifying SQL data statement or a routine invoked by the statement must be defined as MODIFIES SQL DATA.

When both the above conditions become true, it will be necessary to enable conflict detection for the statement. In the preferred embodiment, the SQL compiler performs an analysis of each statement during compilation to determine if the statement meets the above criteria. As the statement is compiled the compiler keeps track of both conditions, if they are both true, a flag is set for the statement and is associated with the executable representation of the statement. This flag is then checked at runtime to determine if the statement needs to be subject to the conflict checking procedure described, or not.

The preferred embodiment may be implemented in a database system implemented in a parallel environment. The preferred embodiment may be implemented within an intra-partition parallel processing environment which permits two routines to each be executing a different nested statement simultaneously beneath a single parent statement. It is also possible for the preferred embodiment to be implemented within an inter-partition processing environment in which the same event may occur but on different machines, potentially in a shared-nothing implementation. To protect its integrity during concurrent access, the list of tables is protected by a latch. In order to allow different database agents to access the same list of tables, a database-unique identifier for the parent statement is associated with the list when it is created and this same identifier is sent with all processing requests underneath the parent statement (shown having the value N in FIG. 1). Each database agent will use this parent statement identifier to locate the one and only copy of the list of tables for that parent statement at each database partition.

To support parallel processing within an intra-partition parallel processing environment, the list of tables is kept in shared memory in the partition where it is available to all database agents working on the same parent statement or nested statements of the parent in the partition.

In a shared-nothing implementation for a partitioned database, each distinct partition uses its own list of tables for each active parent statement. Writing conflicts are only relevant to operations occurring within a particular partition, each the preferred embodiment in each partition performs read/write conflict detection independently of that in any other partition and each partition will have its own independent list of tables reflecting only those tables accessed by statements executing at that partition. If the list of tables does not exist at a database partition, then the execution of the first statement that results in performing read/write conflict contention at that partition will create the list of tables and this list will be used by all subsequent statements executing at the same partition for the same parent statement.

The execution of a parent statement with nested SQL statements in a shared-nothing partitioned database may result in different partitions being visited at different times by different branches of processing for the statement. For this reason, in the preferred embodiment a list of tables for a partition is maintained at the partition for the life of the parent statement to accommodate any subsequent visits. For this reason, in such an environment, when conflict checking has been invoked for a parent statement and the execution of the parent statement has been completed, it is necessary for the parent statement to send a message to each database partition involved in its processing to indicate that all lists of tables created at the partition can now be removed.

Although a preferred embodiment of the present invention has been described here in detail, it will be appreciated by those skilled in the art that other variations may be made. Such variations may be made without departing from the spirit of the invention or the scope of the appended claims.

What is claimed is:

1. A method for detecting conflicts in nested database statements, the method comprising:

associating one or more table access data structures with one or more nested statements within a parent statement at compile time, each of the one or more table access data structures having an associated nested statement, identifying one or more tables accessed by the associated nested statement, and indicating one or more access modes for each of the one or more tables accessed by the associated nested statement;

maintaining a list of tables data structure for the parent statement at runtime, the list of tables data structure identifying one or more tables accessed by the parent statement or the one or more nested statements and indicating one or more table access scopes and one or more access modes for each of the one or more tables accessed by the parent statement or the one or more nested statements, each table access scope being identified by a value, the value of a table access scope defined for the parent statement being a default value, the value of each table access scope defined after the table access scope for the parent statement is defined being based on the value of a previously defined table access scope;

prior to execution of one of the one or more nested statements, comparing the table access data structure associated with the one nested statement to the list of tables data structure to determine whether there is a conflict between the one nested statement and the parent statement, or
the one nested statement and a different nested statement, wherein in response to no conflict being detected and at least one of the one or more tables identified in the table access data structure associated with the one nested statement being found in the list of tables data structure, updating the one or more access modes of the at least one table in the list of tables data structure when a table access scope of the one nested statement matches one of the one or more table access scopes indicated in the list of tables data structure for the at least one table; and updating the one or more table access scopes of the at least one table in the list of tables data structure when a table access scope of the one nested statement does not match the one or more table access scopes indicated in the list of tables data structure for the at least one table.

2. The method of claim 1, wherein a new table access scope is defined when an application starts a database statement, when a user-defined function or method is invoked, or when a stored procedure is invoked directly from a trigger.

3. The method of claim 1, wherein in response to a conflict being detected, the method further comprises:
preventing the one nested statement from executing.

4. The method of claim 1, wherein in response to no conflict being detected and at least one of the one or more tables identified in the table access data structure associated with the one nested statement not being found in the list of tables data structure, the method further comprises:

adding the at least one table to the list of tables data structure; and indicating one or more table access scopes and one or more access modes for the at least one table in the list of tables data structure.

5. The method of claim 1, further comprising:
discarding the list of tables data structure in response to completion of execution of the parent statement.

6. The method of claim 1, further comprising:
identifying the parent statement using a unique identifier; and
identifying the list of tables data structure with the unique identifier used to identify the parent statement.

7. The method of claim 1, wherein each of the one or more tables identified in each of the one or more table access data structures is a permanent table or a declared global temporary table.

8. The method of claim 1, wherein the parent statement and the one or more nested statements are structured query language (SQL) statements.

9. The method of claim 1, wherein no conflict is detected when the one or more tables identified in the table access data structure associated with the one nested statement are not found in the list of tables data structure.

10. The method of claim 1, wherein no conflict is detected when at least one of the one or more tables identified in the table access data structure associated with the one nested statement is found in the list of tables data structure and a table access scope of the one nested statement matches one of the one or more table access scopes indicated in the list of tables data structure for the at least one table or the one or more access modes indicated in the list of tables data structure and in the table access data structure associated with the one nested statement for the at least one table only include read operations.

11. The method of claim 1, wherein a conflict is detected when at least one of the one or more tables identified in the table access data structure associated with the one nested statement is found in the list of tables data structure, a table access scope of the one nested statement does not match the one or more table access scopes indicated in the list of tables data structure for the at least one table, and the one or more access modes indicated in the list of tables data structure for the at least one table include a write or delete operation.

12. The method of claim 1, wherein a conflict is detected when at least one of the one or more tables identified in the table access data structure associated with the one nested statement is found in the list of tables data structure, a table access scope of the one nested statement does not match the one or more table access scopes indicated in the list of tables data structure for the at least one table, the one or more access modes indicated in the list of table data structure for the at least one table include a read operation, and the one or more access modes indicated in the table access data structure associated with the one nested statement for the at least one table include a write or delete operation.

13. The method of claim 1, wherein each of the one or more table access data structures is a part of an executable representation of the associated nested statement.

14. The method of claim 1, wherein each of the one or more access modes includes a read operation, a write operation, or a delete operation.

15. A computer program product including a computer readable medium encoded with a computer program for detecting conflicts in nested database statements, the computer program comprising instructions for:

associating one or more table access data structures with one or more nested statements within a parent statement at compile time, each of the one or more table access data structures having an associated nested statement, identifying one or more tables accessed by the associated nested statement, and indicating one or more access modes for each of the one or more tables accessed by the associated nested statement;

maintaining a list of tables data structure for the parent statement at runtime, the list of tables data structure identifying one or more tables accessed by the parent statement or the one or more nested statements and indicating one or more table access scopes and one or more access modes for each of the one or more tables accessed by the parent statement or the one or more nested statements, each table access scope being identified by a value, the value of a table access scope defined for the parent statement being a default value, the value of each table access scope defined after the table access scope for the parent statement is defined being based on the value of a previously defined table access scope;

prior to execution of one of the one or more nested statements, comparing the table access data structure associated with the one nested statement to the list of tables data structure to determine whether there is a conflict between the one nested statement and the parent statement, or the one nested statement and a different nested statement, wherein in response to no conflict being detected and at least one of the one or more tables identified in the table access data structure associated with the one nested statement being found in the list of tables data structure, updating the one or more access modes of the at least one table in the list of tables data structure when a table access scope of the one nested statement matches one of the one or more table access scopes indicated in the list of tables data structure for the at least one table; and updating the one or more table access scopes of the at least one table in the list of tables data structure when a table access scope of the one nested statement does not match the one or more table access scopes indicated in the list of tables data structure for the at least one table.

16. The computer program product of claim 15, wherein a new table access scope is defined when an application starts a database statement, when a user-defined function or method is invoked, or when a stored procedure is invoked directly from a trigger.

17. The computer program product of claim 15, wherein in response to a conflict being detected, the computer program further comprises instructions for:

preventing the one nested statement from executing.

18. The computer program product of claim 15, wherein in response to no conflict being detected and at least one of the one or more tables identified in the table access data structure associated with the one nested statement not being found in the list of tables data structure, the computer program further comprises instructions for:

adding the at least one table to the list of tables data structure; and indicating one or more table access scopes and one or more access modes for the at least one table in the list of tables data structure.

19. The computer program product of claim 15, wherein the computer program further comprises instructions for:

discarding the list of tables data structure in response to completion of execution of the parent statement.

20. The computer program product of claim 15, wherein the computer program further comprises instructions for:

identifying the parent statement using a unique identifier; and identifying the list of tables data structure with the unique identifier used to identify the parent statement.

21. The computer program product of claim 15, wherein each of the one or more tables identified in each of the one or more table access data structures is a permanent table or a declared global temporary table.

22. The computer program product of claim 15, wherein the parent statement and the one or more nested statements are structured query language (SQL) statements.

23. The computer program product of claim 15, wherein no conflict is detected when the one or more tables identified in the table access data structure associated with the one nested statement are not found in the list of tables data structure.

24. The computer program product of claim 15, wherein no conflict is detected when at least one of the one or more tables identified in the table access data structure associated with the one nested statement is found in the list of tables data structure and a table access scope of the one nested statement matches one of the one or more table access scopes indicated in the list of tables data structure for the at least one table or the one or more access modes indicated in the list of tables data structure and in the table access data structure associated with the one nested statement for the at least one table only include read operations.

25. The computer program product of claim 15, wherein a conflict is detected when at least one of the one or more tables identified in the table access data structure associated with the one nested statement is found in the list of tables data structure, a table access scope of the one nested statement does not match the one or more table access scopes indicated in the list of tables data structure for the at least one table, and the one or more access modes indicated in the list of tables data structure for the at least one table include a write or delete operation.

26. The computer program product of claim 15, wherein a conflict is detected when at least one of the one or more tables identified in the table access data structure associated with the one nested statement is found in the list of tables data structure, a table access scope of the one nested statement does not match the one or more table access scopes indicated in the list of tables data structure for the at least one table, the one or more access modes indicated in the list of table data structure for the at least one table include a read operation, and the one or more access modes indicated in the table access data structure associated with the one nested statement for the at least one table include a write or delete operation.

27. The computer program product of claim 15, wherein each of the one or more table access data structures is a part of an executable representation of the associated nested statement.

28. The computer program product of claim 15, wherein each of the one or more access modes includes a read operation, a write operation, or a delete operation.

* * * * *